United States Patent [19]
Brauer

[11] 4,088,461
[45] May 9, 1978

[54] COMBINATION OF A SUPPLEMENTARY FILTER AND RESPIRATOR FILTER

[75] Inventor: Lothar W. Brauer, Berlin, Germany

[73] Assignee: Auergesellschaft GmbH, Berlin, Germany

[21] Appl. No.: 704,379

[22] Filed: Jul. 12, 1976

[51] Int. Cl.² .............................................. B01D 50/00
[52] U.S. Cl. ........................................ 55/275; 55/359;
55/385 R; 55/480; 55/482; 55/502; 55/509;
55/DIG. 35; 128/142.6
[58] Field of Search ............. 55/275, 279, 316, 385 R,
55/480–482, 502, 507, 509, 359, DIG. 33, DIG.
35, 274; 21/74 R; 128/142.6, 146.6, 146.2, 191 R

[56] References Cited

U.S. PATENT DOCUMENTS

| | | | |
|---|---|---|---|
| 1,315,163 | 9/1919 | Schwartz | 55/316 |
| 1,422,211 | 7/1922 | Lamb | 55/DIG. 33 |
| 2,419,664 | 4/1947 | Tabbert | 55/509 |
| 2,626,678 | 1/1953 | Yant | 55/359 |
| 2,730,192 | 1/1956 | Meyerhoefer | 55/509 |
| 3,802,166 | 4/1974 | Mattsson | 55/472 |
| 3,909,221 | 9/1975 | Bengtsson | 55/480 |
| 3,964,888 | 6/1976 | Hahner | 55/472 |

FOREIGN PATENT DOCUMENTS 872,744   6/1942   France ................... 55/480

Primary Examiner—Frank W. Lutter
Assistant Examiner—David L. Lacey
Attorney, Agent, or Firm—Brown, Murray, Flick & Peckham

[57] ABSTRACT

A supplementary filter housing is provided in one side with an opening for receiving the inlet end of a respirator filter attached to a facepiece. Inside this housing there is a perforated partition between the filter-receiving opening and a portion of the housing that extends laterally away from that opening, whereby to separate the housing into first and second chambers, the second chamber being in the laterally extending portion of the housing and having a perforated outer wall for admission of air. Disposed in the second chamber is a removable filter member that is in the path of air flowing through that chamber from its perforated wall to the perforated partition. The second chamber also has an access opening for insertion and removal of the filter member, which is formed from a material that will dry the air inhaled through it.

8 Claims, 3 Drawing Figures

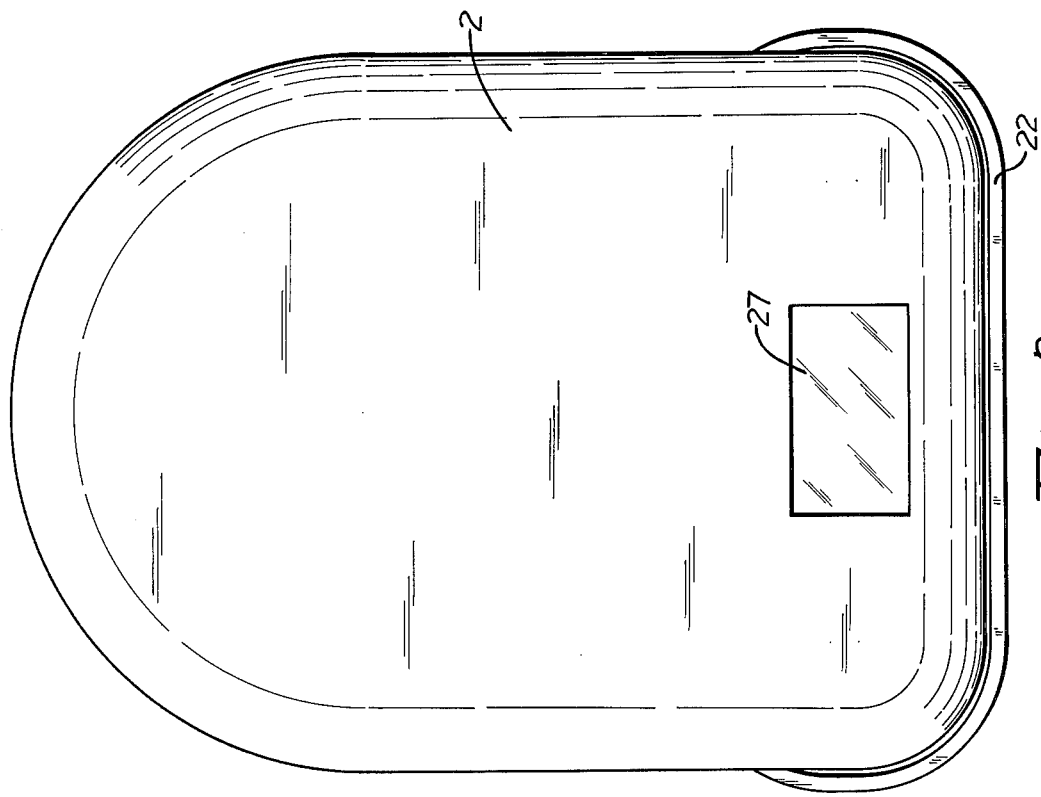
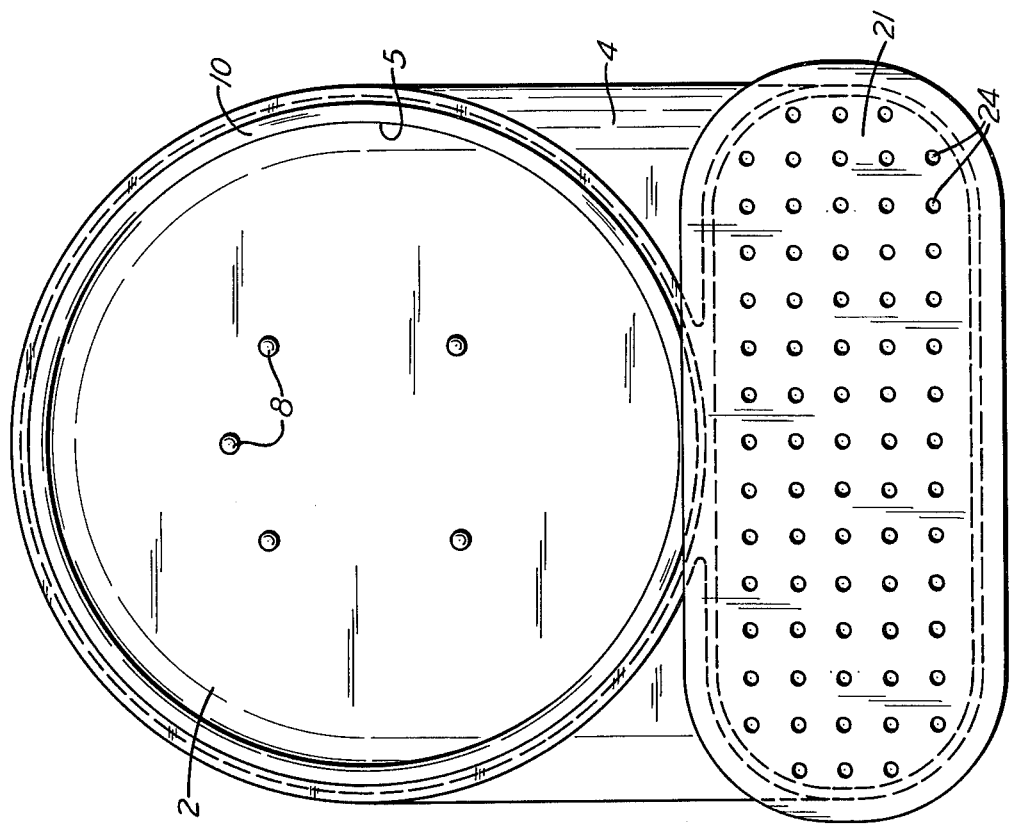

COMBINATION OF A SUPPLEMENTARY FILTER AND RESPIRATOR FILTER

Supplementary filters have been used heretofore in order to increase the operational efficiency of respirator filters, to improve their effectiveness and, in particular, to increase the service life of the respirator filters. It is known that respirator filters which use catalytic material for purifying air passing through them have a relatively short service life even though their catalytic effectiveness otherwise would extend over a much longer period. The shorter life occurs because the catalytic material is very sensitive to water vapor in the air passing through it, as a result of which the material becomes inefficient when it has absorbed a certain amount of water vapor. To overcome this problem it has been proposed that a bed of drying agent be placed in front of the respirator filter to remove water vapor before it can reach the catalyst. The service life of the respirator filter then depends mainly on the type and amount of desiccant used, which is, to a large extent, decisive of the overall height of the filter assembly. However, respirator filters with a large overall height and designed to be directly attached to a facepiece are uncomfortable and inconvenient and put limitations on the motions of the wearer's head.

Respirator filters are known which consist of a number of separate filters arranged one behind the other in tandem. Each separate filter is provided at its front or air inlet end with a screw connector having an inside thread, into which can be screwed an externally threaded connecting member projecting from the back of the filter ahead. However, such a filter system has the drawback that it is necessary initially to provide the air inlet end of the filter with a screw connector provided with an inside thread. This excludes the use of a supplementary filter with existing respirator filters having a different form of construction. In addition, a superposed filter of the same construction as the respirator filter would make the latter uncomfortable for the respirator wearer, on account of size and weight of the assembly.

The objectives of this invention are to provide a supplementary filter which obviates these drawbacks, improves the operational efficiency of existing respirator filters, is easy to attach to the latter, and impedes the movements of the respirator wearer as little as possible.

The appended drawings illustrate by way of example a form of construction in accordance with the invention, which will be described in detail herein, and where FIG. 1 is a central longitudinal cross section of a supplementary filter mounted on a respirator filter;

FIG. 2 is a view of the back of the supplementary filter; and

FIG. 3 is a view of the front of the supplementary filter.

Figure 1:
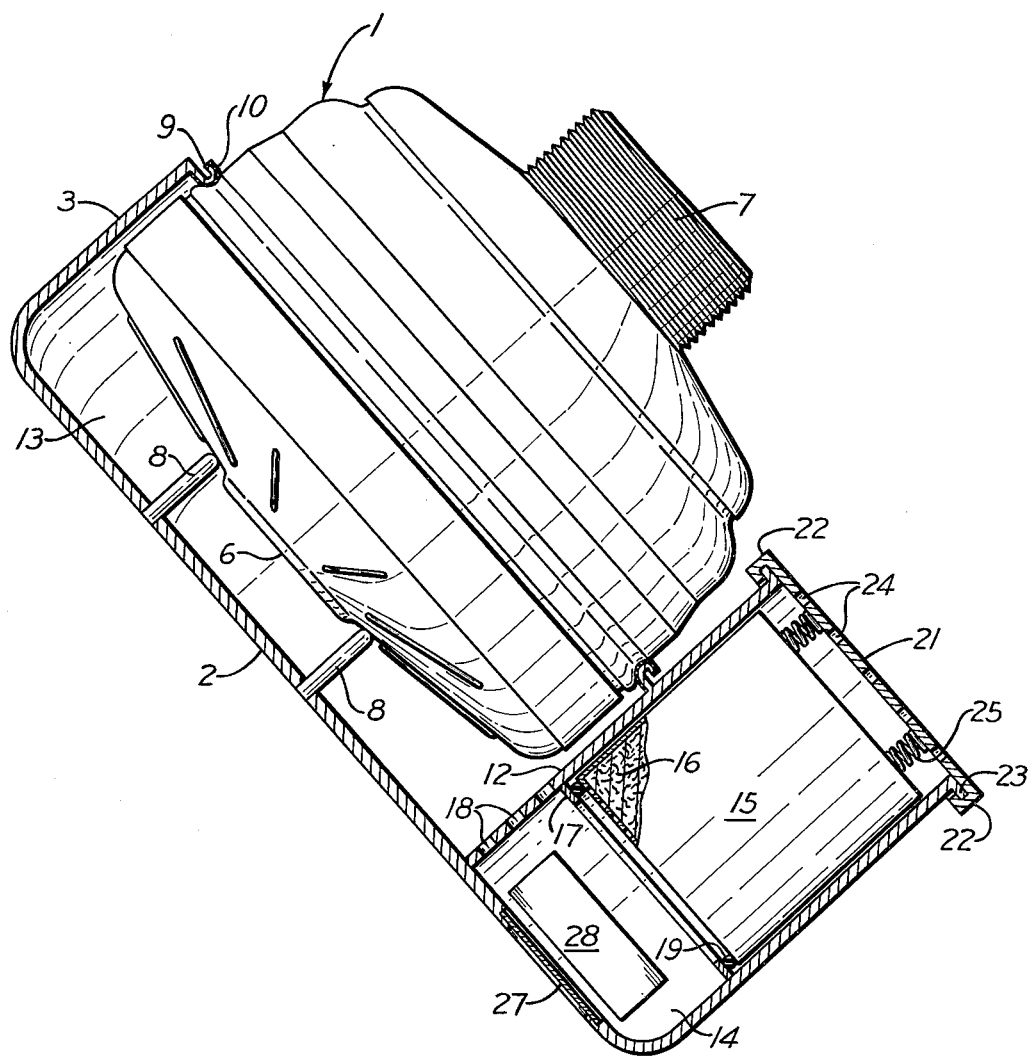

The supplementary filter illustrated in the drawings includes a housing adapted to be mounted on a respirator filter 1 of the type that is attached to a facepiece or gas mask (not shown). Preferably, the material in this respirator filter not only filters inhaled air, but also chemically reacts with impurities in it, such as carbon monoxide, to purify the air. For this purpose it would be filled with a suitable catalyst, such as Hopcalite in the case of carbon monoxide. The supplementary filter housing has a front wall 2 surrounded by a side wall 3, and it also has a back wall 4 (FIG. 2). At one end of the housing (the upper end) the back wall is provided with a circular opening 5 (FIG. 2) for receiving the respirator filter 1, the one shown including a cylindrical casing provided with an air inlet 6 in its front end and an outlet in its back encircled by a threaded sleeve 7 for screwing into an internally threaded opening in a facepiece.

The respirator filter extends only part way into the surrounding housing 1 so that its inlet will not be blocked. To limit the distance that this filter can be inserted, the front wall of the housing may be provided with spacing means, such as rearwardly extending pins 8 that will be engaged by the filter. The housing may be clamped on the respirator filter in different ways, one way being shown in the drawings. Thus, the wall of opening 5 is provided with a thin flange 9 that is turned back upon itself to form a transversely curved surface. The flange is flexible enough to permit it to be slid over the front portion of the respirator filter and then snap into a groove in the filter casing. To provide a good seal between this flange and the filter casing, the curved surface of the flange can be covered with a layer 10 of resilient material, such as rubber.

The supplementary filter housing extends laterally away from one side of opening 5, such as downwardly below the respirator filter when the housing is in place as shown in FIG. 1. This downwardly extending portion of the housing is separated from opening 5 by a perforated partition wall 12, whereby the housing is divided into a first or large chamber 13 for receiving the respirator filter, and a second or smaller chamber 14 below the respirator filter. Inside this second chamber there is a removable filter member formed from a can 15 filled with a drying agent 16 or a porous ion-exchanger which, at the outset, acts as a drying agent but which, after reaching a certain degree of dampness, increasingly assumes the function of the respirator filter. The opposite ends of this can are perforated so that air can flow through it. Inside the second chamber there is a continuous ledge 17 that is spaced from the front wall of the chamber. The openings 18 through partition wall 12 are all located between this ledge and the front wall. The outlet end of the filter member is seated against the ledge, preferably with an intervening sealing gasket 19. To permit a filter member of adequate depth to be used, it is desirable that the wall of this second chamber be extended rearwardly from the back wall 4 of the housing as shown in FIG. 1.

To permit air to be drawn into the second chamber 14 and through the filter member inside of it, it is necessary that an outside wall of the second chamber be provided with one or more inlet openings. Also, to permit insertion and removal of the filter member there must be an access opening. Preferably, this access opening is at the back of the second chamber and normally is enclosed by a cover 21 provided with grooved flanges 22 that receive parallel flanges 23 projecting from the rear end of the adjoining chamber wall so that the cover can be slid lengthwise on and off. With this arrangement, the cover can be provided with the openings 24 for admission of air to the second chamber. By inserting resilient means, such as coil springs 25, between the cover and the adjacent end of filter can 15, the filter member will be pressed against the sealing gasket on ledge 17. The springs can be permanently attached to the cover.

The invention disclosed herein permits the service life of the respirator filter 1 to be extended many times over because the filter member in the second chamber 14 of the supplementary filter will remove water vapor from the air being inhaled, which otherwise would be absorbed by the catalyst in the respirator filter and soon increase its breathing resistance to the point where the respirator filter would have to be replaced. It is simpler and less expensive to replace the filter member in the lower part of the supplementary filter when the drying agent 16 in it becomes spent or exhausted. In order to indicate when such a condition has occurred, it is desirable to provide the front wall 2 of the second chamber 14 with a window 27 and to place a color-change member 28 in the chamber behind the window. Such members are well known. They change color when they become moist. When the drying agent in can 15 no longer is able to remove a major part of the water vapor from the incoming air flowing through it, this vapor will cause the color of the color-change member to change, thereby showing that the filter member in the second chamber should be replaced. Of course, the entire supplementary filter can be replaced, whenever one wishes, by simply pulling it off the respirator filter and snapping a new supplementary filter in place.

It is preferred to mold the supplementary filter housing in one piece from rubber or a thermosetting plastic. Such a housing can be made quickly at little cost and it is lightweight.

The advantages to be gained from the invention reside, in particular, in the fact that the hold-up time, and thus the service life of the respirator filter, is extended many times over. While the respirator is in use, the supplementary filter can be attached to the respirator filter by slipping it on, and it also can be replaced. By repeated replacement of it or the filter member it contains, the service life of the respirator filter can be further extended. The supplementary filter is not a spatial elongation of the breathing filter, but is mounted close to it, which ensures freedom of movement, especially to the head, of the respirator wearer. The flat construction of the supplementary filter and its light weight make it convenient to carry it in a coat pocket.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A combination of a respirator filter having a front end provided with an air inlet, and a supplementary filter comprising a housing having a back side provided with an opening receiving said front end of the respirator filter, the wall of said supplementary filter containing said opening surrounding said respirator filter and engaging it to hold the supplementary filter thereon, said housing having a front wall opposite said respirator filter receiving opening and also having a portion extending laterally away from one side of said opening and rearwardly from said front wall beside the respirator filter, a perforated partition wall inside said housing between said lateral portion and said respirator filter receiving opening to separate the housing into first and second chambers, said second chamber being in said laterally extending portion of the housing and having an outer side wall and outer front and rear walls one of said outer walls of said second chamber being perforated for admission of air, and a removable filter member in said second chamber in the path of air flowing through that chamber from said perforated outer wall to said perforated partition wall and into said first chamber.

2. The combination with a respirator filter according to claim 1, including means inside said first chamber for spacing said respirator filter from said front wall of said housing.

3. The combination with a respirator filter according to claim 1, in which said perforated outer wall is on the same side of the housing as said respirator filter receiving opening.

4. The combination with a respirator filter according to claim 1, in which said second chamber has an access opening, and said perforated outer wall is a removable cover normally closing said access opening.

5. The combination with a respirator filter according to claim 1, in which said filter member is a desiccating agent.

6. The combination with a respirator filter according to claim 5, including a window in the front wall of said second chamber, and a color-change member in the second chamber between said window and said filter member for indicating when the filter member is spent.

7. The combination with a respirator filter according to claim 5, in which said second chamber has an access opening at the same side of the housing as said respirator filter receiving opening, said perforated outer wall is a removable cover closing the access opening, said second chamber is provided with a ledge between said filter member and the front wall of the second chamber, said filter member being in sealing relation with said ledge, and the perforations in said partition wall being located only between said ledge and the front wall of the second chamber.

8. The combination with a respirator filter according to claim 7, including a window in said last-mentioned wall, and a color-change member in the second chamber between said window and said filter member for indicating when the filter member is spent.

* * * * *